Patented Sept. 20, 1932

1,878,987

UNITED STATES PATENT OFFICE

ROBERT E. SCHMIDT, OF ELBERFELD, BERTHOLD STEIN, OF MANNHEIM, AND KURT BAMBERGER, OF ELBERFELD, GERMANY, ASSIGNORS TO GENERAL ANILINE WORKS, INC., OF NEW YORK, N. Y., A CORPORATION OF DELAWARE

MANUFACTURE OF 1.4.4'-TRIHYDROXY-2.2'-DIANTHRAQUINONYL-3.1'-OXIDE

No Drawing. Application filed September 22, 1930, Serial No. 483,746, and in Germany October 1, 1929.

The present invention relates to a process of preparing 1.4.4'-trihydroxy-2.2'-dianthraquinonyl-3.1'-oxide.

The Brit. specification No. 10074/1903 describes as substance B a product obtained in addition to substance A by heating quinizarine with weakly alkaline salt solutions to temperatures exceeding 100° C. The statements of R. Scholl and co-workers (Berichte der deutschen chemischen Gesellschaft, volume 52 (1919) page 2254) relating to the constitution of this compound are not correct. Recent investigations of the inventors (published in Berichte der deutschen chemischen Gesellschaft, volume 63 page 300) have shown that the constitution 1.4.1'-4'-tetrahydroxy-2.2'-dianthraquinonyl established by Scholl for compound B is in fact that of substance A of the above specification, the existence of which substance was disputed by Scholl. The substance B, in agreement with the description of specification No. 10074/1903, does in fact possess two hydrogen atoms less than substance A and has been proved to be 1.4.4'-trihydroxy-2.2'-dianthraquinonyl-3.1'-oxide of the formula:—

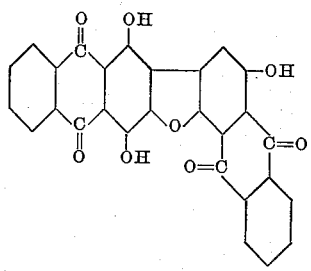

In accordance with the present invention the substance A is converted into the furane derivative in question by heating it to a temperature above about 200° C. and advantageously surmounting 250° C. in the presence of a high boiling organic nitro compound preferably one of aromatic character as, for example, 1.3-dinitrobenzene, 2.4-dinitro-1-chlorobenzene, nitronaphthalenes, dinitronaphthalenes or the like. The reaction is finished as soon as a test portion dissolved in sulfuric acid containing boric acid no longer shows the spectrum of substance A, but only that of substance B. The conversion proceeds very smoothly and yields the substance B directly in high purity. This constitutes the great advantage of the new process in comparison with the process of British spec. No. 10074/03, which necessitates the use of superatmospheric pressure and, in addition, the separation of the compound A, which is simultaneously formed as a by-product.

The invention is illustrated by the following example without being restricted thereto:—

*Example.*—50 parts by weight of 1.4.1'.4'-tetrahydroxy-2.2'-dianthraquinonyl (substance A of the British spec. No. 10074/1903) are introduced into 500 parts by weight of molten alpha-nitronaphthalene and the whole is heated to boiling. After a short time a test portion in sulfuric acid containing boric acid no longer shows the spectrum of substance A, but only that of substance B. After cooling the reaction mixture to 90° C. and diluting it with hot chlorobenzene, the brown crystals, which separate, are filtered with suction. The product thus obtained is identical in every respect with substance B of Brit. specification No. 10074/1903.

We claim:—

1. Process which comprises heating 1.4.1'.4'-tetrahydroxy-2.2'-dianthraquinonyl with an organic nitro compound of the benzene or naphthalene series to a temperature above about 200° C., until a test portion dissolved in sulfuric acid containing boric acid no longer shows the spectrum of the starting material.

2. Process which comprises heating 1.4.1'.4'-tetrahydroxy-2.2'-dianthraquinonyl with a high boiling aromatic nitro compound of the benzene or naphthalene series to a temperature above about 200° C., until a test portion dissolved in sulfuric acid containing boric acid no longer shows the spectrum of the starting material.

3. Process which comprises heating to boiling 1.4.1′.4′-tetrahydroxy-2.2′-dianthraquinonyl in alpha-nitronaphthalene, until a test portion dissolved in sulfuric acid containing boric acid no longer shows the spectrum of the starting material.

In testimony whereof, we affix our signatures.

ROBERT E. SCHMIDT.
BERTHOLD STEIN.
KURT BAMBERGER.